June 17, 1941.    J. SHERMAN    2,246,325

WATT-HOUR METER

Filed Sept. 3, 1938

WITNESSES:
C. J. Weller.
C. L. Freedman

INVENTOR
Jerome Sherman.
BY
ATTORNEY

Patented June 17, 1941

2,246,325

UNITED STATES PATENT OFFICE 2,246,325

WATT-HOUR METER

Jerome Sherman, Newark, N. J., assignor to Westinghouse Electric & Manufacturing Company, East Pittsburgh, Pa., a corporation of Pennsylvania Application September 3, 1938, Serial No. 228,300

8 Claims. (Cl. 175—183)

This invention relates to a method and apparatus for checking rotating bodies, and it has particular relation to the testing of instruments of the watt-hour meter type.

Despite the long and extensive utilization of watt-hour meters, a practical equipment for testing such meters has been available only for a short time. One of the most successful devices for testing meters is based in part on the teaching of the Blathy Patent No. 1,199,150, which discloses a stroboscopic method for testing meters. In accordance with this method a meter disc is provided with uniformly spaced markings or openings, and these are illuminated by light which pulsates at a predetermined frequency. If the meter is operating properly the markings or openings appear to be stationary in the pulsating light, but if the meter is fast or slow the markings slowly drift clockwise or counter-clockwise according to whether the meter is slow or fast. In the latter case, the meter is adjusted until the markings or openings appear stationary. This procedure is not entirely satisfactory for the reason that it does not give an accurate indication of the variation of the meter from its normal operating condition.

In accordance with my invention, the drift of markings or openings, when viewed by pulsating or stroboscopic illumination, is counted for a predetermined arc of rotation of the rotating body in terms of the number of markings or openings which appear to slip past a fixed point. When examining rotating bodies, in this way, it is convenient to magnify the markings or openings usually seven to ten times. Under such magnification it is difficult to watch the rotating body in order to determine when the body has rotated through the predetermined arc. In order to simplify this problem, I provide the rotating body with an irregularity which indicates its passage past the predetermined point.

It is, therefore, an object of my invention to provide apparatus for determining the degree of departure of a rotating body from a normal operating condition.

It is a further object of my invention to provide a stroboscopic testing unit capable of indicating the rotation of a body through a predetermined arc.

It is a further object of my invention to provide a method for determining the degree of departure of a rotating body from a normal operating condition.

Other objects of my invention will be apparent from the following description taken in conjunction with the accompanying drawing in which.

Figure 1:
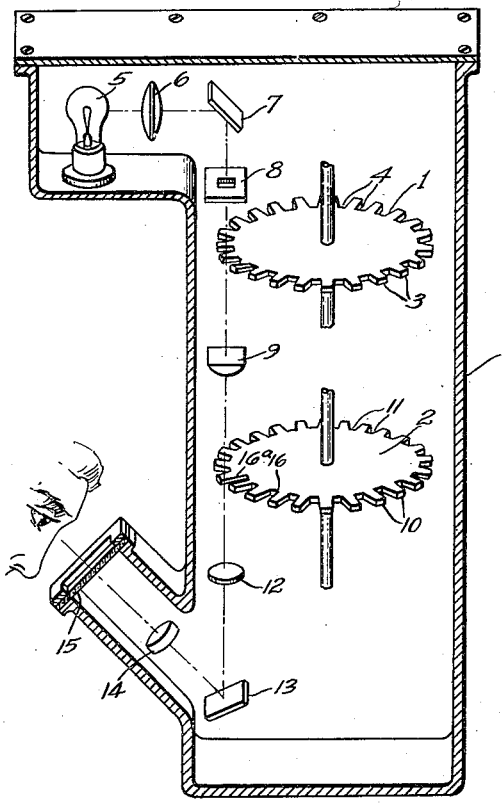
Figure 1 is a diagrammatic view in front perspective of a stroboscopic unit embodying my invention.

Referring to the drawing, Fig. 1 shows a disc 1 of a standard meter mounted for rotation in axial alinement with a disc 2 of a meter to be adjusted, hereinafter referred to as a test meter. Since the disc 1 is intended to operate as a light shutter for the stroboscopic unit, it is provided with a plurality of equally spaced teeth 3 which define slots for the passage of light. A casing C may be provided or omitted as desired.

Light is supplied to the disc 1 from any convenient source such as an electric lamp 5 having a suitable optical system positioned for directing a beam across the path of the slots 4. As illustrated, the optical system may comprise a condenser lens 6, a reflecting mirror 7 and a slitted shield member 8 for restricting the beam of light.

After it has passed through the slots 4, the resulting pulsating light is gathered by a cylindrical lens 9 and focused on a peripheral portion of the disc 2. This peripheral portion is provided with suitable stroboscopic markings or openings such as a plurality of teeth 10 which define slots 11 that may correspond in number and spacing to the slots 4 of disc 1. After leaving the disc 2 the light beam is focused by means of a condenser lens 12 and reflecting mirror 13 and a concave lens 14 upon a viewing plate 15 which may be of ground glass. It is to be understood that the particular elements disclosed for use in directing the beam of light may be replaced by any suitable optical system. For example, a spherical convex lens is a satisfactory substitute for the cylindrical lens 9.

In operating a unit of this type, it is customary to subject the standard meter and the test meter to the same load. If the test meter operating properly, the teeth 10 will appear to be stationary when inspected at the viewing point, but if the test meter is slow or fast a drift of the teeth 10 past the viewing point will be noted in a direction dependent upon whether the meter is fast or slow. The number of teeth which appear to drift past the viewing point in one revolution of the meter disc 2 or in any other predetermined arc of rotation thereof may be taken as an indication of the error of the test meter.

In order to provide an image that may be inspected readily, it is customary to amplify the image at the viewing plate 15 between seven and ten times the actual size of the object. With this application, it is inconvenient for the operator to follow the rotation of the disc 2 and to note when it has made a single revolution or when it has rotated through any other predetermined arc. In order to indicate clearly at the viewing plate when the disc has passed through a predetermined arc, I prefer to provide the disc 2 with one or more irregularities which may be observed at the viewing plate 15. For example, it is convenient to deepen or elongate one of the slots 16, such as the slot 16a, so that whenever this slot passes the viewing plate the picture of the elongated slot will warn the operator that the disc is starting or finishing a predetermined arc of rotation. When a single slot is employed, the disc 2 rotates a full revolution between reappearances of the slot.

It is believed that the operation of the structure thus far described is apparent from the foregoing description. The operator first positions a test meter with its disc 2 below the disc 1 of standard meter and connects them for energization by the same load. For test purposes the load applied may be full load, a light load such as 10% full load, or any other desired loading. If under these circumstances the operator notices no drift of the teeth 10 across the viewing plate 15, it follows that the test meter is operating correctly, but if the operator notices a drift of the teeth 10, he waits until the slot 16 appears in the viewing plate 15 and then begins to count the number of teeth 10 which drift past the viewing plate until the slot 16 reappears. The number of teeth which he counts in this manner gives him an accurate indication of the magnitude of the correction required to bring the test meter to its normal operating condition, and he then proceeds to make this correction. After the correction the meter may be again tested in the same fashion. If desired, the viewing plate may be provided with a hair line or other reference marking.

Figure 2:
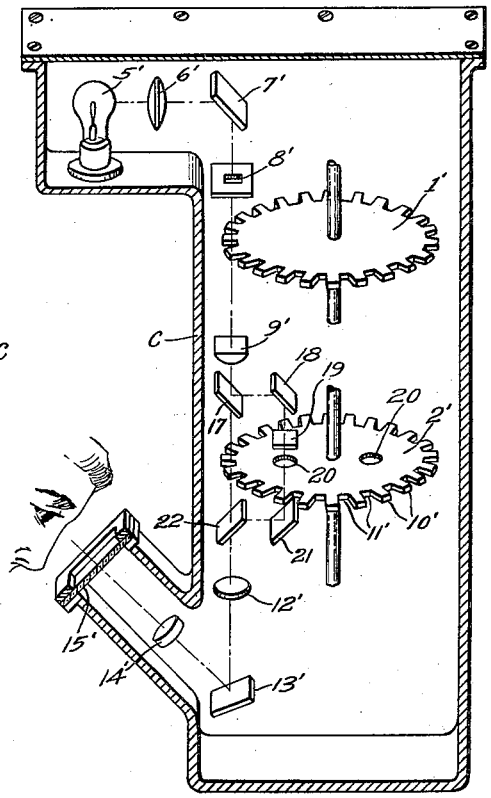
Fig. 2 is a diagrammatic view in front perspective of a modification of the unit shown in Fig. 1.

Although the modification shown in Fig. 1 has proven to be extremely effective and is preferred, my invention may be embodied in other modifications. For example, in Fig. 2 I disclose an arrangement in which a differently colored flash of light appears at the viewing point for indicating the start and end of a predetermined arc or rotation of the test meter. In Fig. 2 the source of light 5', lens 6', mirror 7', shield member 8', disc 1' and cylindrical lens 9' are exactly the same as the corresponding elements of Fig. 1. However, the light leaving the cylindrical lens 9' is split into two portions by a suitable reflecting mirror or reflecting prism 17 which may, for example, be a sheet of glass coated with a thin transparent reflecting coating which reflects a portion of the light striking it and transmits the remainder. The reflected portion of the light is directed by a reflecting mirror or prism 18 through a color filter 19 across the path of one or more holes 20 provided in a disc 2' of a test meter. Any light passing through the openings 20 is directed by means of a reflecting mirror 21 to a reflecting mirror or prism 22 similar in design to the mirror or prism 17. At this point the two beams of light are reunited and focused by means of a condensing lens 12', a reflecting mirror 13' and a concave lens 14' onto a viewing plate 15', all of which are similar to the corresponding elements of Fig. 1. In this case the disc 2' is provided with a plurality of equally spaced teeth 10' and slots 11', no elongated slot being required. The holes 20 may be the ordinary anti-creep holes customarily provided in meter discs.

In operation, the teeth 10' at the viewing plate will appear to drift in either of two directions according to whether or not the test meter is fast or slow. At periodic intervals a flash of colored light appears across the viewing plate produced by the passage of light through the filter 19 and one of the openings 20. The color of the light, of course, may be regulated by the color of the filter 19 selected. In order to determine the magnitude of the correction required, the operator may count the number of teeth 10' which drift by the viewing point between each reappearance of the color flash of light or between every other reappearance of the colored flash. When two openings 20 are provided reappearances of the colored flash indicate half revolutions of the disc 2' and the number of teeth counted in this interval indicates the drift for a half revolution of the meter disc. If the operator desires to count the drift for a full revolution, he may start counting when he sees a colored flash and continue to count until he sees a second reappearance of the colored flash.

Although I have found that the apparatus and procedure above described is very effective for testing meters or other rotating bodies at various loads, it is particularly effective for light load tests when the meter disc or rotating body operates very slowly.

If it is desired to compare the rotation of the meters for a predetermined arc of rotation of the standard meter disc, the indicating means may be transferred to the standard meter disc. For example, the disc 1' may be provided with openings similar to the openings 20, and reflecting members 17, 18, 21 and 22 may be shifted upwardly for by-passing a portion of the light through the openings thus provided in the standard disc and reuniting the by-passed light to the main beam above the cylindrical lens. By employing a filter for the by-passed light similar to the filter 19, a colored flash will appear at the viewing point for predetermined arcs of rotation of the standard disc 1'.

Instead of employing reflecting members 17, 18 and a filter 19, an independent colored light source may be mounted above the path of the creep holes for directing a beam of light through the creep holes onto the reflecting mirror 21.

Figure 3:
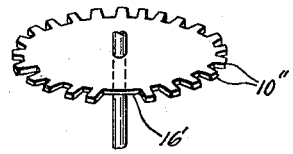
Fig. 3 is a view in perspective of a modified disc suitable for the unit shown in Fig. 1.

The elongated slot 16 of Fig. 1 may be replaced with satisfactory results by other configurations such as that shown in Fig. 3. Here the irregularity is provided by omitting one of the teeth 10" of a meter disc to provide a wide slot 16' which is clearly apparent to the operator when it passes through the light beam.

Although I have described my invention with reference to specific embodiments thereof, it is obvious that many modifications thereof are possible. Therefore, I do not wish my invention to be restricted except as required by the appended claims when interpreted in view of the prior art.

I claim as my invention:

1. The method for adjusting an adjustable instrument having a rotatable member provided with a pattern thereon associated therewith, which comprises energizing said instrument, applying to said pattern a pulsating radiation varying at a frequency such that said pattern appears stationary relative to said radiation when said instrument is operating correctly, indicating a predetermined arc of rotation of said member, determining the amount by which said pattern appears to slip past a point during said predetermined arc of rotation of said member, and adjusting said instrument in accordance with said amount.

2. The method for adjusting an adjustable instrument having a member rotatable about an axis and provided with pattern elements uniformly spaced from and around said axis, said member also having a discontinuity, which comprises energizing said instrument, illuminating said pattern with a pulsating illumination varying at a frequency such that said pattern appears stationary when said instrument is operating correctly, counting the number of said elements which slip by a predetermined point between appearances of said discontinuity, and adjusting the instrument in accordance with said number.

3. A method for testing rotating bodies provided with a peripheral portion having alternating elements differently responsive to radiation and an interiorly positioned hole which comprises projecting a pulsating radiation across the path of travel of said peripheral portion, projecting a second radiation across the path of travel of said hole, and combining said radiations as modified by said portion and hole in a simultaneously visible record.

4. In a test system, means for focusing at a view point two distinguishable beams of light, a rotatable body having a first portion positioned for rotation across the path of a first one of said light beams and a second portion positioned for rotation across the path of a second one of said light beams, said portions having alternating zones differently affecting said light beams, the zones of said first portion successively crossing the path of the first light beam substantially less frequently than the zones of said second portion successively cross the path of said second light beam during rotation of said body, and means for fluctuating said second light beam.

5. In a test unit for a device to be tested, a source of radiation, means for interrupting said radiation at a rate corresponding to proper operation of said device, means for similarly modifying said radiation in accordance with the actual operation of said device, and means for giving said radiation a distinctive appearance at the beginning and end of a predetermined operation of said device.

6. In a regulating system, a meter having a rotatable disc, means for applying to said disc a first radiation, means on said disc for periodically modifying said radiation in accordance with the rate of rotation of said disc, means for supplying a second radiation distinguishable from said first radiation, and means for periodically modifying said second radiation in accordance with the rate of rotation of said disk, but at a substantially lower frequency than said first-named modification.

7. In an instrument, a member rotatable about an axis, a plurality of uniformly spaced distinctive elements positioned on said member at points equidistant from said axis whereby said elements during rotation of said member pass adjacent a predetermined point, said member having a formation distinctive from said elements and positioned to pass adjacent said predetermined point less frequently than said elements, and means for applying an alternating illumination to said member at said point.

8. In a meter disc, a plurality of protuberance portions separated by recess portions uniformly spaced about the periphery thereof, one of said portions differing in shape from adjacent portions.

JEROME SHERMAN.